United States Patent
Liao

(10) Patent No.: US 10,469,704 B2
(45) Date of Patent: Nov. 5, 2019

(54) CONTROLLED DEVICE, CONTROL DEVICE, CONTROL SYSTEM USING THE SAME AND CONTROL METHOD USING THE SAME

(71) Applicant: AVISION INC., Hsinchu (TW)

(72) Inventor: Chun-Chieh Liao, Hsinchu (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 15/959,336

(22) Filed: Apr. 23, 2018

(65) Prior Publication Data

US 2018/0343359 A1 Nov. 29, 2018

(30) Foreign Application Priority Data

May 26, 2017 (TW) .............................. 106117751 A

(51) Int. Cl.
- *H04N 1/327* (2006.01)
- *G06K 15/00* (2006.01)
- *H04N 1/00* (2006.01)

(52) U.S. Cl.
CPC ....... *H04N 1/32773* (2013.01); *G06K 15/007* (2013.01); *H04N 1/0097* (2013.01); *H04N 1/00233* (2013.01)

(58) Field of Classification Search
CPC .................. H04N 1/32773; G06K 15/007
See application file for complete search history.

(56) References Cited

U.S. PATENT DOCUMENTS

| | | | |
|---|---|---|---|
| 5,312,098 A * | 5/1994 | Inoue | B65H 3/5261 271/122 |
| 5,642,185 A | 6/1997 | Altrieth, III et al. | |
| 6,622,178 B1 | 9/2003 | Burke et al. | |
| 8,078,768 B2 | 12/2011 | Manor et al. | |
| 2005/0041987 A1* | 2/2005 | Lee | B65H 5/38 399/16 |
| 2007/0260783 A1 | 11/2007 | Combs et al. | |
| 2008/0189693 A1 | 8/2008 | Pathak | |
| 2009/0059314 A1* | 3/2009 | Liao | H04N 1/00209 358/474 |
| 2009/0073481 A1 | 3/2009 | Ferlitsch et al. | |
| 2010/0004988 A1 | 1/2010 | Matsuo | |

(Continued)

FOREIGN PATENT DOCUMENTS

| | | |
|---|---|---|
| CN | 101369260 | 2/2009 |
| EP | 2355482 A1 | 8/2011 |

(Continued)

OTHER PUBLICATIONS

Taiwan Intellectual Property Office, "Office Action", dated Apr. 2, 2018.

(Continued)

*Primary Examiner* — Ibrahim Siddo
(74) *Attorney, Agent, or Firm* — WPAT, PC

(57) ABSTRACT

A controlled device, a control device, a control system using the same and a control method using the same are provided. The controlled device is configured for receiving a trigger event, and outputting a trigger signal in response to the trigger event. The control device is configured for receiving the trigger signal from the controlled device, and loading an application program corresponding to the trigger event in response to the trigger signal.

10 Claims, 5 Drawing Sheets

(56) References Cited

U.S. PATENT DOCUMENTS

| | | |
|---|---|---|
| 2010/0049881 A1 | 2/2010 | Manor et al. |
| 2011/0160875 A1* | 6/2011 | Taguchi .................. G06F 9/485 |
| | | 700/17 |
| 2014/0078549 A1* | 3/2014 | Amiya ............... H04N 1/00233 |
| | | 358/1.15 |

FOREIGN PATENT DOCUMENTS

| | | |
|---|---|---|
| TW | 373836 | 11/1999 |
| TW | 470920 B | 1/2002 |
| WO | WO2012027991 A1 | 3/2012 |
| WO | WO2013077058 | 5/2013 |

OTHER PUBLICATIONS

Taiwan Intellectual Property Office, "Office Action", dated Oct. 31, 2018.
Office action issued by TIPO dated May 28 2019.

\* cited by examiner

CONTROLLED DEVICE, CONTROL DEVICE, CONTROL SYSTEM USING THE SAME AND CONTROL METHOD USING THE SAME

This application claims the benefit of Taiwan application Serial No. 106117751, filed May 26, 2017, the subject matter of which is incorporated herein by reference.

BACKGROUND OF THE INVENTION

Field of the Invention

The invention relates in general to a controlled device, the control device and a control system and a control method using the same, and more particularly to a controlled device, a control device and a control system using the same which output a trigger signal in response to a trigger event and a control method using the same.

Description of the Related Art

In a conventional image capture device, such as a multi-function machine, documents are normally loaded in an automatic paper feeder, and relevant operation information is displayed on a user interface through which the user on site can copy or scan the documents. However, such operation requires the user to be on site, and therefore limits the user's flexibility of operation.

SUMMARY OF THE INVENTION

The invention is directed to a controlled device, a control device and a control system using the same, and a control method using the same capable of resolving the above problems.

According to one embodiment of the present invention, a controlled device is provided. The controlled device includes a receiver element and a controlled end processing unit. The receiver element is configured for receiving a trigger event. The controlled end processing unit is configured for outputting a trigger signal to a control device in response to the trigger event. The control device loads in an application program corresponding to the trigger event in response to the trigger signal. The application program outputs an instruction signal for controlling an action of the controlled device, and the action comprises at least one of firmware action and mechanism operation.

According to another embodiment of the present invention, a control device is provided. The control device includes a control end connection port and a control end processing unit. The control end connection port is configured for receiving a trigger signal from a controlled device, wherein the trigger signal is outputted by the controlled device in response to a trigger event. The control end processing unit loads in an application program corresponding to the trigger event in response to the trigger signal, wherein the application program outputs an instruction signal for controlling an action of the controlled device, and the action comprises at least one of firmware action and mechanism operation.

According to an alternate embodiment of the present invention, a control system is provided. The control system includes a controlled device and a control device. The controlled device is configured for receiving a trigger event, and outputting a trigger signal in response to the trigger event. The control device is configured for receiving a trigger signal from the controlled device, and loading an application program corresponding to the trigger event in response to the trigger signal, wherein the application program outputs an instruction signal for controlling an action of the controlled device, and the action comprises at least one of firmware action and mechanism operation.

According to another alternate embodiment of the present invention, a control method is provided. The control method includes following steps: receiving a trigger event by a controlled device; outputting a trigger signal by the controlled device in response to the trigger event; receiving the trigger signal from the controlled device by a control device; and loading an application program corresponding to the trigger event by the control device in response to the trigger signal, wherein the application program outputs an instruction signal for controlling an action of the controlled device, and the action comprises at least one of firmware action and mechanism operation.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1A:
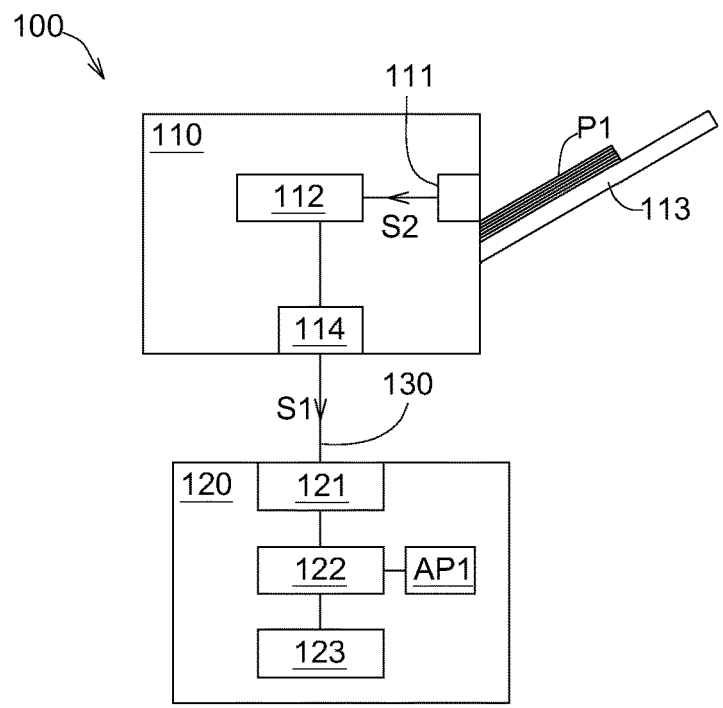
FIG. 1A shows a functional block diagram of a control system according to an embodiment of the present invention.
Figure 1B:
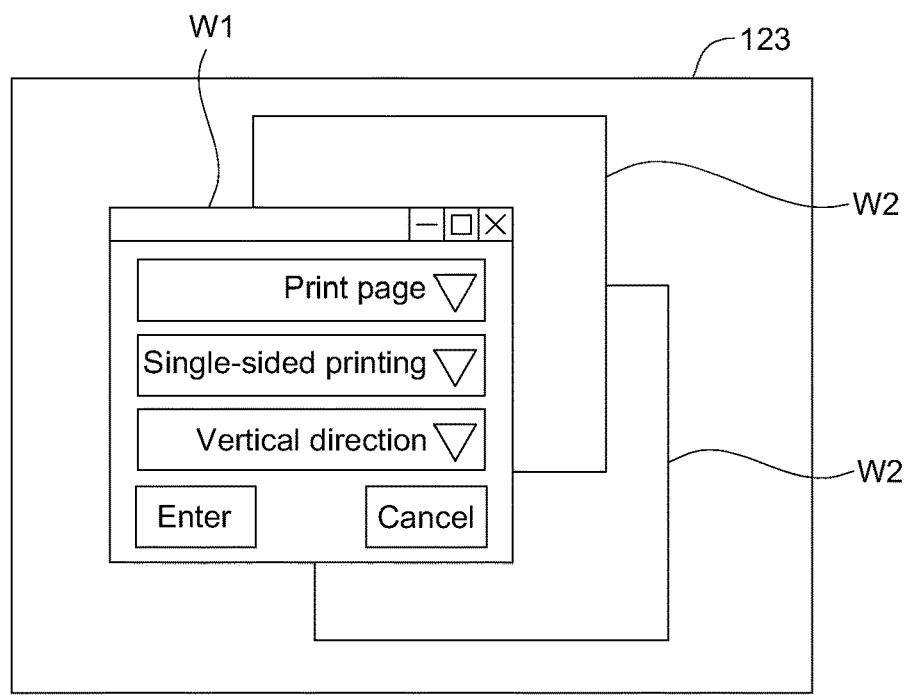
FIG. 1B shows a functional block diagram of an operation interface of the control device of FIG. 1A.

Refer to FIGS. 1A-1B. FIG. 1A shows a functional block diagram of a control system 100 according to an embodiment of the present invention. FIG. 1B shows a functional block diagram of an operation interface of the control device 120 of FIG. 1A.

The control system 100 includes a controlled device 110, a control device 120 and a connection cable 130. The controlled device 110 and the control device 120 can be realized by two separate and independent electronic devices, wherein signals are transmitted between the controlled device 110 and the control device 120 through the connection cable 130. In the present embodiment, the controlled device 110 can be realized by such as a scanner, a photocopier, a printer, a multi-function machine, a video camera or other types of image capture devices. The controlled device 110 can also be realized by other types of electronic devices, such as household appliances. The control device 120 can be realized by such as a hand-held electronic device, a computer, or other electronic devices capable of operating the controlled device 110.

In the control method using the control system 100 according to an embodiment of the present invention, the controlled device 110 can receive a trigger event and output a trigger signal S1 to the control device 120 in response to the trigger event. The control device 120 can receive the trigger signal S1 from the controlled device 110, and load in an application program corresponding to the trigger event in response to the trigger signal S1.

In the present embodiment, the controlled device 110 is exemplified by a multi-function machine, and the trigger event is such as: "Feeding paper".

For example, the controlled device 110 includes a receiver element 111, a controlled end processing unit 112, an automatic paper feeder 113 and a controlled end connection port 114. In addition to the above elements, the controlled device 110 can further include relevant software and hardware capable of executing the functions of the controlled device 110.

The controlled end processing unit 112 is electrically connected to the receiver element 111 and the controlled end connection port 114. The automatic paper feeder 113 is configured for receiving a paper P1. The receiver element 111, such as a sensor, can sense the feeding of the paper P1. Here, the sensor can be realized by an infra-red sensor, a position sensor or other elements capable of sensing the trigger event. When the receiver element 111 senses the feeding of the paper P1, the receiver element 111 outputs a sensing signal S2 to the controlled end processing unit 112, which accordingly outputs the trigger signal S1 to the control device 120.

The control device 120 includes a control end connection port 121, a control end processing unit 122 and a control end display unit 123. The control end processing unit 122 is electrically connected to the control end connection port 121 and the control end display unit 123.

The control end connection port 121 of the control device 120 is connected to the controlled end connection port 114 of the controlled device 110 through the connection cable 130. The connection cable 130 is such as a universal serial bus (USB) cable. Each of the control end connection port 121 and the controlled end connection port 114 is such as a USB port. When the connection cable 130 connects the control device 120 to the controlled device 110, the control device 120 can be connected to the controlled device 110 through the connection cable 130 and install an application program AP1 capable of operating the controlled device 110. The application program AP1, not illustrated in the diagram, can be stored in a storage unit such as a hard disc or a memory of the control device 120.

When the control end connection port 121 receives the trigger signal S1 from the controlled device 110, the control end processing unit 122 loads in an application program AP1 corresponding to the trigger event in response to the trigger signal S1. For example, since the trigger event is: "Feeding paper", the application program AP1 can provide any operations such as printing and/or scanning that are related to the capturing of paper images. The operations may include following settings such as the settings of print page, single/ double sided, paper size, auto sorting, custom border, number of pages per sheet, enter key and/or cancel key. The present invention does not limit the types of operations, and the operations can be any operations related to the capturing of paper images.

As indicated in FIG. 1B, when the control end connection port 121 receives the trigger signal S1 from the controlled device 110, the control end processing unit 122 loads in an application program AP1 corresponding to the trigger event in response to the trigger signal S1, and controls the control end display unit 123 to display (pop up) an operation window W1 of the application program AP1. The application program AP1 automatically loads in the operation window W1 after receiving the trigger signal S1 or directly pops up the operation window W1 without requiring the operator to create an operation window after receiving the application program AP1.

The operator can perform the above operations through the operation window W1. Also, when the control end processing unit 122 controls the control end display unit 123 to display the operation window W1 of the application program AP1, the control end processing unit 122 displays the operation window W1 on the topmost layer of a number of created windows W2. Thus, the operator can directly operate the operation window W1 without having to drag the operation window W1 to the topmost layer of the created windows. In the present embodiment, the controlled device 110 can further include a controlled end display unit (not illustrated), and the screen area of the control end display unit is larger than that of the controlled end display unit. Since the display area provided by the control end display unit 123 is relatively larger than that provided by the controlled end display unit of the controlled device 110, the control end display unit 123 can display more windows with larger texts or pictures, such that the operator can operate the operation windows more conveniently and more efficiently. Besides, when the control device 120 is realized by a hand-held electronic device, the operator does not have to operate the controlled device 110 on the site. The operator can hold the control device 120 and then walk and operate the application program AP1 at the same time.

Figure 2A:
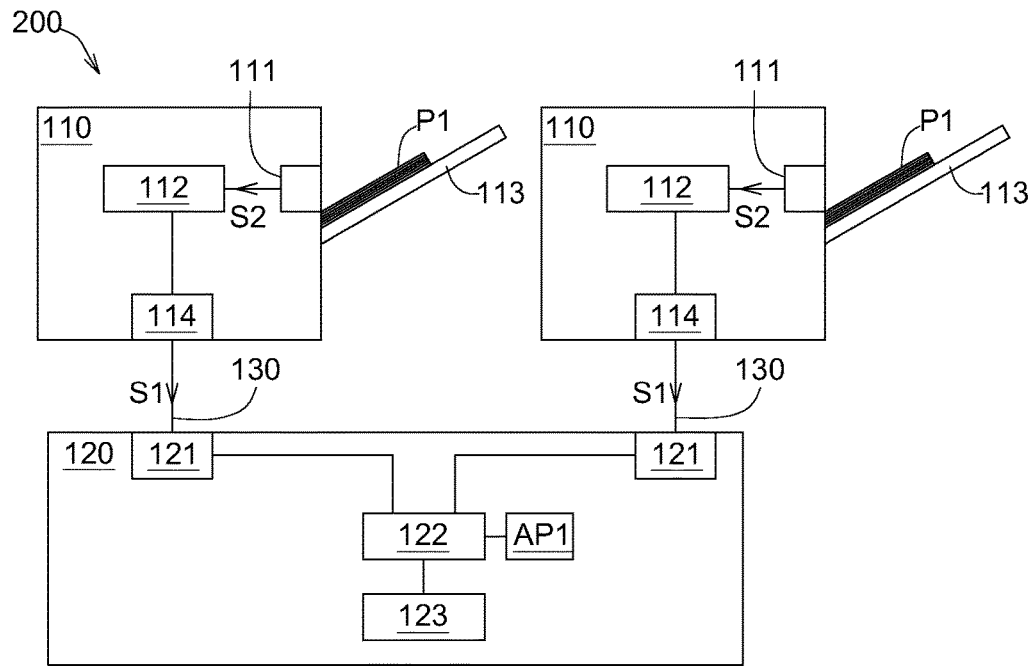
FIG. 2A shows a functional block diagram of a control system according to another embodiment of the present invention.
Figure 2B:
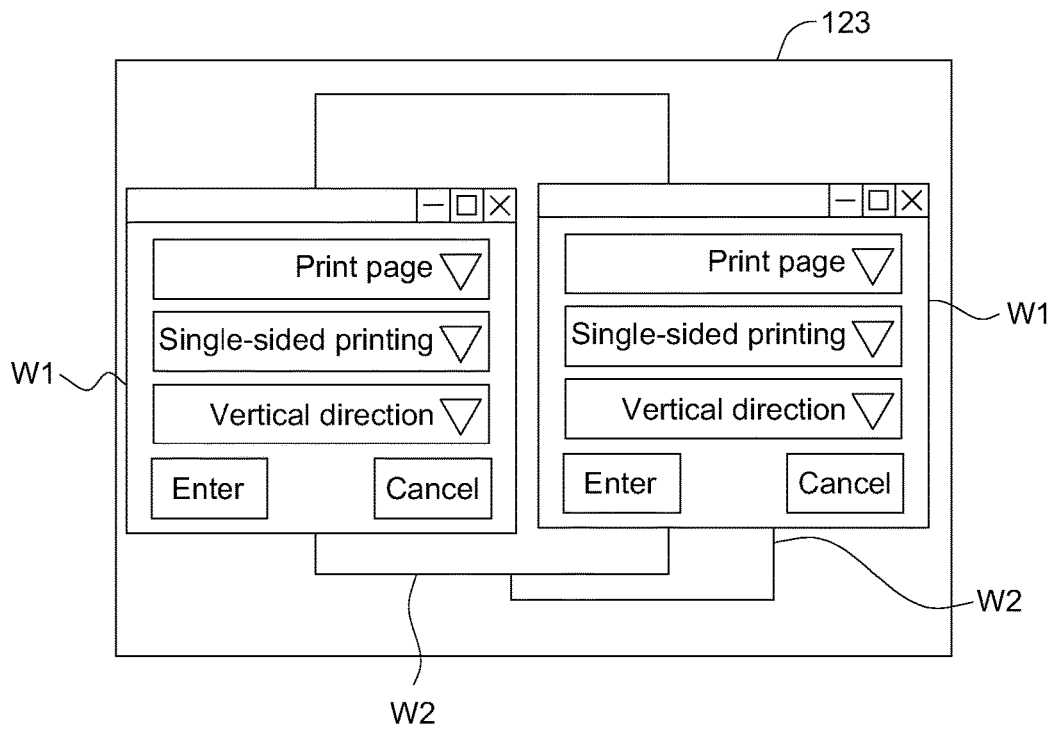
FIG. 2B shows a schematic diagram of an operation interface of the control device of FIG. 2A.

Refer to FIGS. 2A-2B. FIG. 2A shows a functional block diagram of a control system 200 according to another embodiment of the present invention. FIG. 2B shows a schematic diagram of an operation interface 120 of the control device of FIG. 2A. The control system 200 includes a number of controlled devices 110, a control device 120, and a number of connection cables 130. In the following descriptions of the present embodiment, the quantity of controlled devices 110 is exemplified by two. However, the quantity of controlled devices 110 can be three, four or more than four. The types of the controlled devices 110 can be the same or different.

The control end connection port 121 is further configured for receiving two trigger signals S1 from two controlled devices 110. Each trigger signal S1 is outputted by a corresponding controlled device 110 in response to a corresponding trigger event. The control end processing unit 122 is further configured for loading two operation windows W1 of the application program AP1 in response to the two trigger signals S1. The two operation windows W1 are respectively the operation windows of the two controlled devices 110. Depending on the types of the controlled device 110, the two operation windows W1 can respectively provide the same or different operation interfaces. Since the identification of the controlled device 110 is already verified during the connection to the control device 120, the operator can independently operate a corresponding controlled device 110 through each operation window W1. Moreover, two operation windows W1 are created by the same application program AP1. In other words, once the same application program AP1 is installed, a number of operation windows W1 corresponding to a number of controlled devices 110 can therefore be created.

Figure 3:
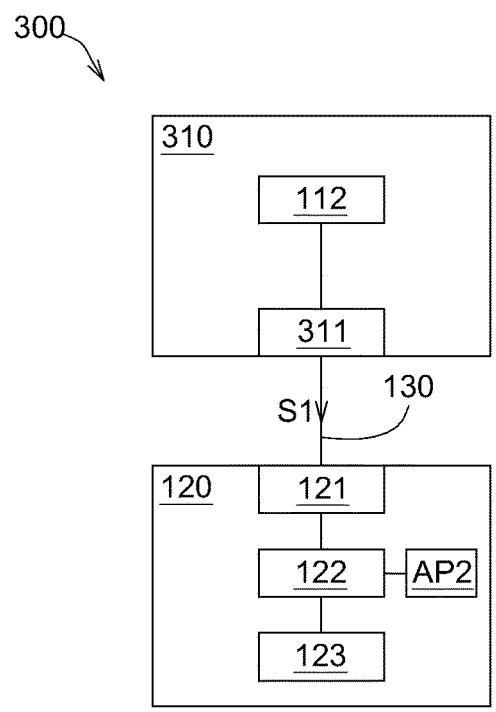
FIG. 3 shows a functional block diagram of a control system according to another embodiment of the present invention.

Referring to FIG. 3, a functional block diagram of a control system 300 according to another embodiment of the present invention is shown. The control system 300 includes a controlled device 310, a control device 120 and a connection cable 130. The controlled device 310 can be realized by such as a scanner, a photocopier, a printer, a multi-function machine, a video camera or other types of image capture device. The controlled device 310 can also be realized by other types of electronic devices.

The controlled device 310 includes a receiver element 311 and a controlled end processing unit 112. The controlled end processing unit 112 is electrically connected to the receiver element 311. Unlike the controlled device 110 of the above embodiments, the receiver element 311 of the controlled device 110 of the present embodiment is realized by a controlled end connection port, such a USB port. In the present embodiment, the trigger event is: "Connecting the receiver element 311 of the controlled device 310 to the control end connection port 121 of the control device 120 by the connection cable 130". To put it in greater details, when the connection cable 130 connects the receiver element 311 of the controlled device 310 to the control end connection port 121 of the control device 120, the controlled end processing unit 112 electrically connected to the receiver element 311 accordingly outputs a trigger signal S1 to the control device 120. The control device 120 loads in a corresponding application program AP2 in response to the trigger signal S1.

When the controlled device 310 is realized by an image capture device, the application program AP2 can be similar to the application program AP1. In another embodiment, the application program AP2 and the application program AP1 can be realized by the same application program. When the controlled device 310 is realized by a video camera, the application program AP2 provides a setting of camera parameters and/or a setting of file access paths of the controlled device 310. Examples of the setting of camera parameters include exposure, resolution, hand shake correction, camera mode and/or quality. Examples of the setting of file access paths include the directory name under which the target images are stored. However, the operations of the application program AP2 of the embodiments of the present invention are not limited to the operations exemplified above, and can be other operations related to the functions and/or settings of the controlled device 310. In another embodiment, the quantity of the controlled device 310 of the control system 300 can be two or more than two. The control system 300 is similar to the control system 200, and the similarities are not repeated here.

Figure 4:
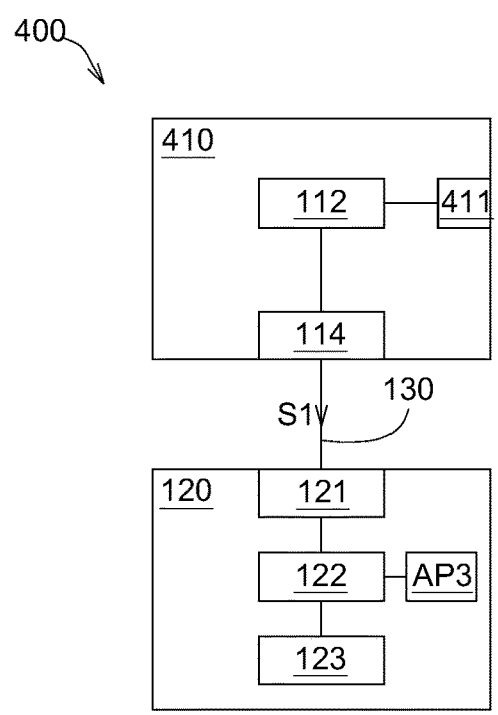
FIG. 4 shows a functional block diagram of a control system according to another embodiment of the present invention.

Referring to FIG. 4, a functional block diagram of a control system 400 according to another embodiment of the present invention is shown. The control system 400 includes a controlled device 410, a control device 120 and a connection cable 130. The controlled device 410 can be realized by such as a scanner, a photocopier, a printer, a multi-function machine, a video camera or other types of image capture device. The controlled device 410 can also be realized by other types of electronic device.

The controlled device 410 includes a receiver element 411, a controlled end processing unit 112 and a controlled end connection port 114. The controlled end processing unit 112 is electrically connected to the receiver element 411 and the controlled end connection port 114. In the present embodiment, the receiver element 411 can be realized by such as a power switch, and the trigger event is: "Triggering the receiver element 411 to turn on the power". To put it in greater details, when the operator triggers the receiver element 411 to turn on the power, the controlled end processing unit 112 electrically connected to the receiver element 411 accordingly outputs a trigger signal S1 to the control device 120. The control device 120 loads in a corresponding application program AP3 in response to the trigger signal S1. The application program AP3 can be similar to the application program AP1 or AP2. In another embodiment, the application program AP3 and the application program AP1 or AP2 disclosed above can be realized by the same application program.

Moreover, the receiver element 411 is not limited to a power switch, and can also be realized by any physical or virtual key of the controlled device 410, which makes the controlled end processing unit 112 of the controlled device 410 switches to the wake up mode from the sleep mode after the receiver element 411 is triggered. In the present example, the trigger event is: "Switching to the wake up mode".

Figure 5:
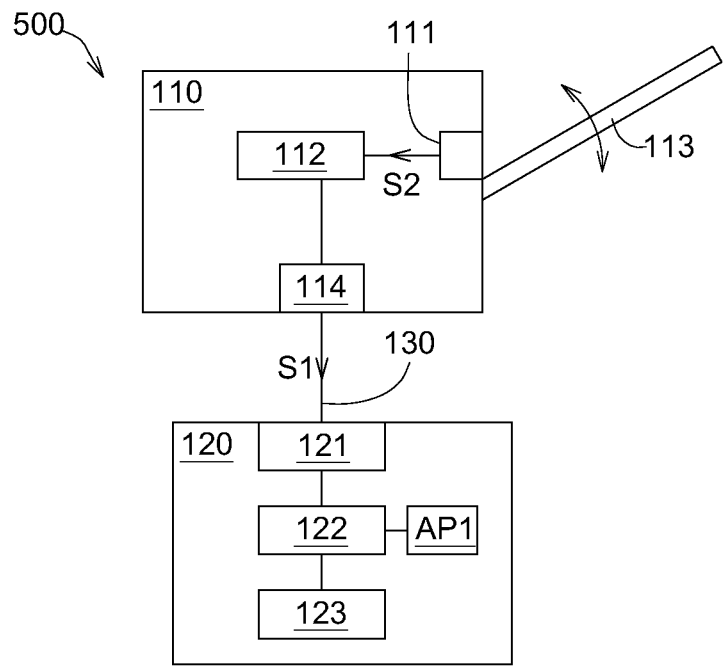
FIG. 5 shows a functional block diagram of a control system according to another embodiment of the present invention.

Referring to FIG. 5, a functional block diagram of a control system 500 according to another embodiment of the present invention is shown. The control system 500 includes a controlled device 110, a control device 120 and a connection cable 130. Unlike the control system 100, the trigger event of the control system 500 of the present embodiment is: "Activating the automatic paper feeder". To put it in greater details, when the automatic paper feeder 113 is activated to receive the paper P1 (illustrated in FIG. 1A), the receiver element 111 senses the activation of the automatic paper feeder 113 and outputs a sensing signal S2 to the controlled end processing unit 112. The controlled end processing unit 112 outputs a trigger signal S1 to the control device 120, which accordingly loads in the application program AP1. However, the embodiments of the present invention are not limited thereto, and the trigger event can be: "Changing the state of other elements of the controlled device 110".

Figure 6:
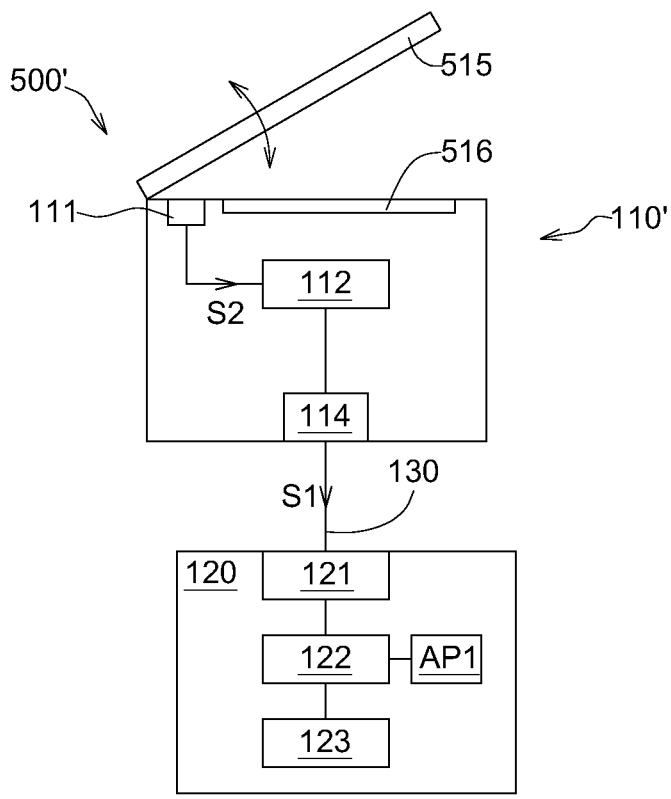
FIG. 6 shows a functional block diagram of a control system according to another embodiment of the present invention.

Referring to FIG. 6, a functional block diagram of a control system 500' according to another embodiment of the present invention is shown. The control system 500' includes a controlled device 110', a control device 120 and a connection cable 130. Unlike the control system 500, the trigger event of the control system 500' of the present embodiment is: "Closing the upper cover". To put it in greater details, the controlled device 110' includes a receiver element 111, a controlled end processing unit 112, a controlled end connection port 114, an upper cover 515, and an image capture region 516.

The paper P1 (not illustrated) can be placed on the image capture region 516. When the receiver element 111 senses that the upper cover 515 is closed, the receiver element 111 outputs a sensing signal S2 to the controlled end processing unit 112, which accordingly outputs a trigger signal S1 to the control device 120, such that the control device 120 accordingly loads in the application program AP1.

Figure 7:
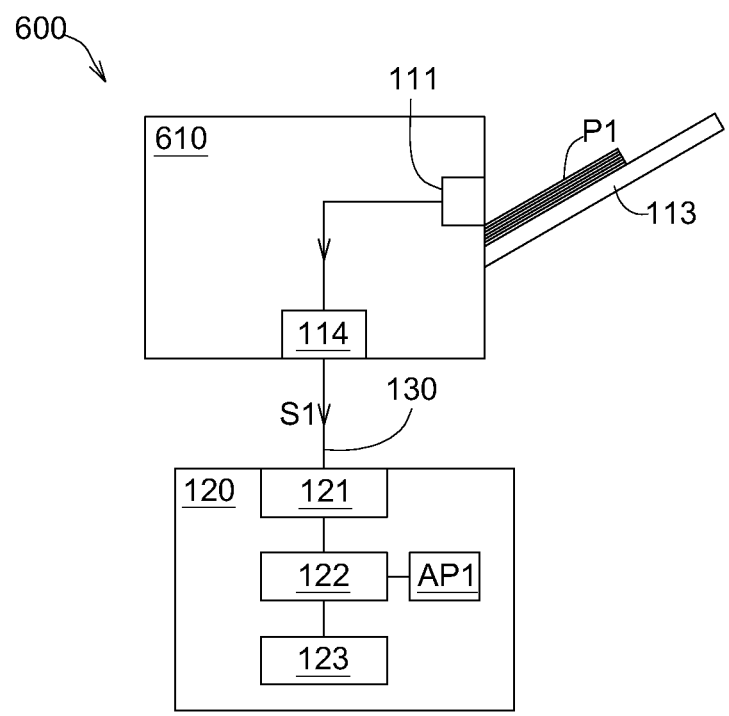
FIG. 7 shows a functional block diagram of a control system according to another embodiment of the present invention.

Referring to FIG. 7, a functional block diagram of a control system 600 according to another embodiment of the present invention is shown. The control system 600 includes a controlled device 610, a control device 120 and a connection cable 130. Unlike the control system 100, the controlled device 610 of the present embodiment dispenses with the controlled end processing unit 112. Under such design, when receiving the trigger event, the receiver element 111 outputs a trigger signal S1 to the control device 120, which accordingly loads in an application program AP1. In other words, although the controlled device 110 does not have any processing units, the control method of the present invention embodiment still can be completed using the control end processing unit 122 of the control device 120.

To summarize, the control system of the present invention embodiment includes at least a controlled device and a control device. When receiving the trigger event, the controlled device outputs a trigger signal to the control device, which accordingly loads in an application program in response to the trigger signal. Thus, the operator does not have to be on the site to operate the controlled device. Besides, the instruction signal outputted by the application program can control an action of the entire controlled device or an action of a portion of the controlled device. The action includes at least one of firmware action and mechanism operation. Suppose the action includes both firmware action and mechanism operation, such as the action of an office machine. Apart from the control of firmware/software, the action further includes the control of mechanism, such as the control of rollers, scanning module, or other hardware control capable of executing the functions of the controlled device. In an embodiment, the trigger event can be a pre-action for operating the functions of the controlled device, such as an event of feeding paper, turning on power, connecting the connection cable, or other types of trigger events. In another embodiment, the application program can provide an operation interface for operating the controlled device. The operation interface includes the function of setting the controlled device and/or the function of activating the controlled device. In other embodiments, when the control device receives a trigger signal, an operation window can be popped up from the automatically loaded application program for the operator to directly operate without having to additionally create an operation window. In other embodiments, after the operation window is created, the operation window is immediately located on the topmost layer of all created windows. Thus, the operator can directly operate the operation window without having to drag the operation window to the topmost layer of the created windows. In other embodiments, when the state of the trigger event changes, for example, the state of the trigger event changes to the state prior to the occurrence of the trigger event or the state following the termination of the trigger event, the controlled end processing unit of the controlled device or the control end processing unit of the control device can selectively uninstall the loaded application program.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A controlled device, comprising:
   a receiver element configured for receiving a trigger event;
   an automatic paper feeder;
   an upper cover; and
   a controlled end processing unit configured for outputting a trigger signal to a control device in response to the trigger event;
   wherein the trigger event is feeding paper, activating the automatic paper feeder, or closing the upper cover;
   wherein the control device loads in an application program corresponding to the trigger event in response to the trigger signal, an instruction signal outputted by application program is configured for controlling an action of the controlled device, and the action comprises at least one of firmware action and mechanism operation;
   wherein the receiver element is disposed within a casing of the controlled device and adjacent to the automatic paper feeder, or disposed right below the upper cover when the upper cover is closed.

2. The controlled device according to claim 1, wherein the receiver element is a power switch, a controlled end connection port or a sensor.

3. The controlled device according to claim 1, wherein the controlled device is an image capture device.

4. A control system, comprising:
   a controlled device as claimed in claim 1, configured for receiving a trigger event, and outputting a trigger signal in response to the trigger event; and
   a control device configured for receiving the trigger signal from the controlled device, and loading an application program corresponding to the trigger event in response to the trigger signal, wherein an instruction signal outputted by application program is configured for controlling an action of the controlled device, and the action comprises at least one of firmware action and mechanism operation.

5. The control system according to claim 4, wherein the controlled device is an image capture device.

6. The control system according to claim 4, wherein the control device further comprises a control end display unit configured for displaying an operation window of the application program.

7. The control system according to claim 6, wherein the operation window is located on the topmost layer of a plurality of windows displayed by the control end display unit.

8. The control system according to claim 6, wherein the controlled device further comprises a controlled end display unit, wherein a screen area of the control end display unit is larger than that of the controlled end display unit.

9. The control system according to claim 4, comprising two controlled devices, wherein the control device is further configured for receiving two trigger signals from two controlled devices, each trigger signal is outputted by a corresponding controlled device in response to the corresponding trigger event; and the control device is further configured for loading two operation windows of the application program respectively corresponding to the two controlled devices in response to the two trigger signals.

10. A control method, comprising:
    receiving a trigger event by a controlled device;
    outputting a trigger signal by the controlled device in response to the trigger event;
    receiving the trigger signal from the controlled device by a control device; and
    loading an application program corresponding to the trigger event by the control device in response to the trigger signal, wherein an instruction signal outputted by application program is configured for controlling an action of the controlled device, and the action comprises at least one of firmware action and mechanism operation;
    wherein said controlled device comprises:
    a receiver element configured for receiving a trigger event;

an automatic paper feeder;
an upper cover; and
a controlled end processing unit configured for outputting a trigger signal to a control device in response to the trigger event;
wherein the trigger event is feeding paper, activating the automatic paper feeder, or closing the upper cover;
wherein the control device loads in an application program corresponding to the trigger event in response to the trigger signal, an instruction signal outputted by application program is configured for controlling an action of the controlled device, and the action comprises at least one of firmware action and mechanism operation; and
wherein the receiver element is disposed within a casing of the controlled device and adjacent to the automatic paper feeder, or disposed right below the upper cover when the upper cover is closed.

* * * * *